United States Patent [19]
Nilsen et al.

[11] Patent Number: 6,120,636
[45] Date of Patent: Sep. 19, 2000

[54] APPARATUS AND METHOD FOR PRODUCING RETROREFLECTIVE MATERIAL HAVING PRINTED PATTERNS THEREON

[75] Inventors: Robert B. Nilsen, Weatogue; Gus Bernard, West Hartford; Michael J. Hanrahan, Danbury, all of Conn.

[73] Assignee: Reflexite Corporation, Avon, Conn.

[21] Appl. No.: 09/170,014

[22] Filed: Oct. 13, 1998

Related U.S. Application Data

[63] Continuation-in-part of application No. 09/013,696, Jan. 26, 1998.

[51] Int. Cl.$^7$ .............................. B32B 31/12; B41M 3/14; B29D 11/00; B29D 7/01; G02B 5/124
[52] U.S. Cl. .................. 156/230; 156/231; 156/240; 156/277; 156/384; 428/172; 264/1.9; 264/214; 359/530
[58] Field of Search .................. 156/230, 231, 156/234, 235, 237, 238, 240, 247, 277, 384, 287; 264/1.6, 1.9, 212, 214; 359/520, 530, 400; 428/172, 178

[56] References Cited

U.S. PATENT DOCUMENTS

| | | | |
|---|---|---|---|
| 2,143,946 | 1/1939 | Hunter | 41/36 |
| 2,231,139 | 2/1941 | Reininger | 40/135 |
| 2,354,049 | 7/1944 | Palmquist | 40/135 |
| 2,422,256 | 6/1947 | Phillippi | 40/135 |
| 3,689,346 | 9/1972 | Rowland | 156/245 |
| 4,082,426 | 4/1978 | Brown | 350/105 |
| 4,202,600 | 5/1980 | Burke et al. | 350/103 |
| 4,656,072 | 4/1987 | Coburn, Jr. et al. | 428/40 |
| 4,952,023 | 8/1990 | Bradshaw et al. | 350/102 |
| 5,213,872 | 5/1993 | Pricone et al. | 428/195 |
| 5,262,225 | 11/1993 | Wilson et al. | 428/203 |
| 5,310,436 | 5/1994 | Pricone et al. | 156/209 |
| 5,393,590 | 2/1995 | Caspari | 429/195 |
| 5,442,870 | 8/1995 | Kochanowski | 40/582 |
| 5,558,740 | 9/1996 | Bernard et al. | 156/231 |
| 5,592,330 | 1/1997 | Bernard | 359/529 |
| 5,643,400 | 7/1997 | Bernard et al. | 156/500 |
| 5,670,096 | 9/1997 | Lu | 264/1 |
| 5,763,049 | 6/1998 | Frey et al. | 428/172 |

FOREIGN PATENT DOCUMENTS

| | | |
|---|---|---|
| 0175031 A1 | 11/1984 | European Pat. Off. . |
| 96/03285 | 2/1996 | WIPO . |

OTHER PUBLICATIONS

"Stork Micro Rotary Screen Printing Systems: Productivity, Quality, Flexibility," a brochure published by Stork X–cel Inc., Holbrook, New York.

"Rotary Screen Technologies for Coating Applications," a brochure published by Stork X–cell B.V., Boxmeer, The Netherlands.

"The Stork X–cell Rotary Scren Printing/Coating System," a brochure published by Stork X–cell B.V., Boxmeer, The Netherlands.

"Rotary Screen Integration Program (RSI®)," a brochue published by Stork Screens B.V., Boxmeer, The Netherlands.

*Primary Examiner*—Richard Crispino
*Assistant Examiner*—J. A. Lorengo
*Attorney, Agent, or Firm*—Hamilton, Brook, Smith & Reynolds, P.C.

[57] ABSTRACT

A continuous process for producing printed patterns on retroreflective material is disclosed, wherein a partially cured pattern is printed on a roll of film and partially cured cube-corner prisms are bonded to the film over the printed matter thereby encapsulating the printed matter to protect the printed matter from the environment.

17 Claims, 8 Drawing Sheets

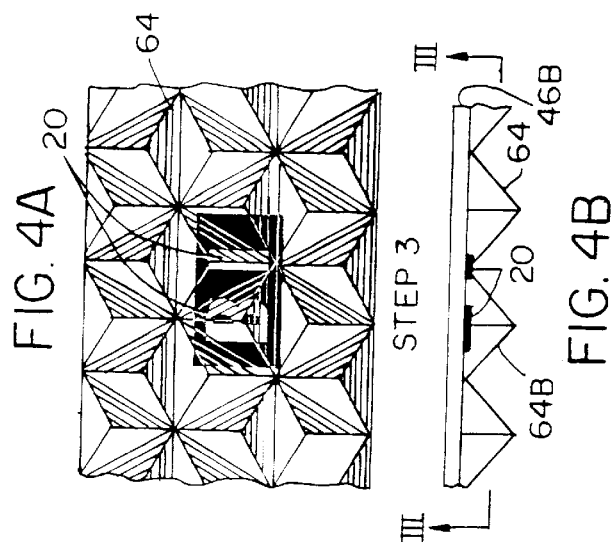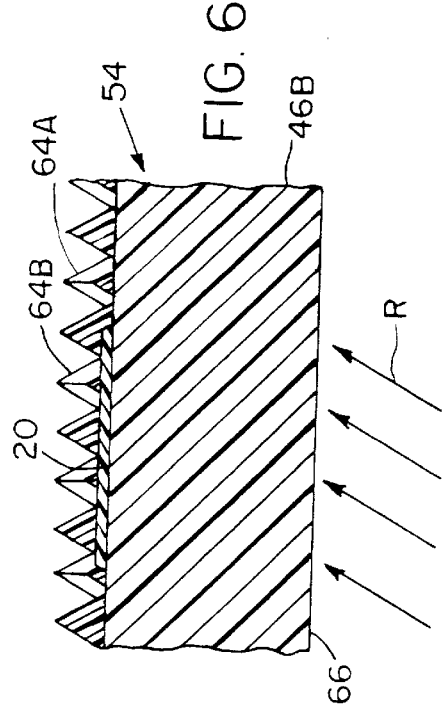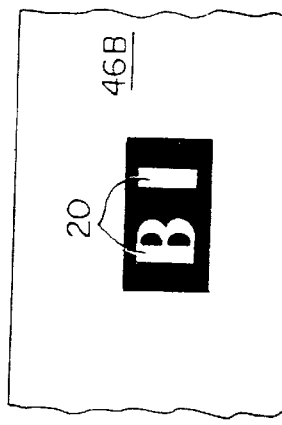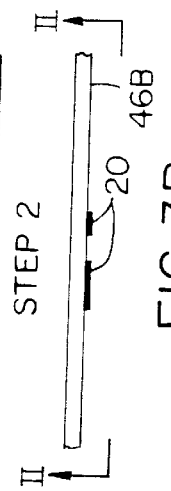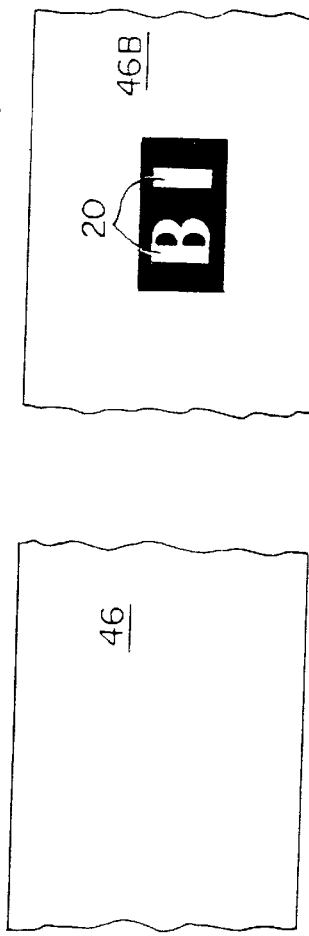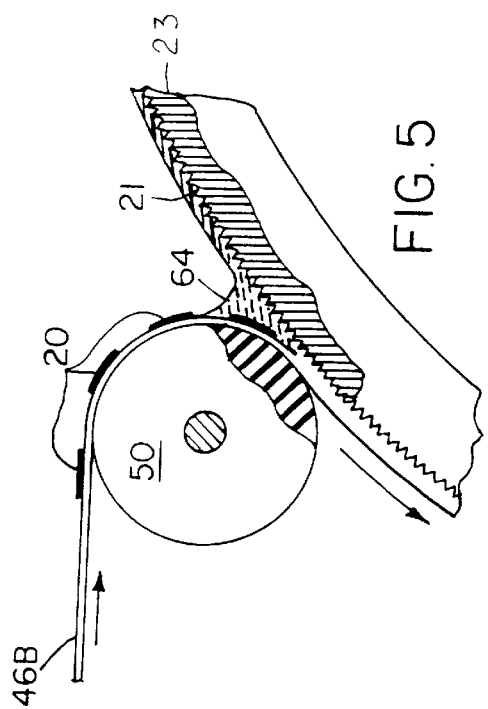

Prism Forming System

Combined Color In/On Tie Coat and Air or Gas Sphere Prisms

Combined Color in Prisms and Air or Gas Sphere Prisms

APPARATUS AND METHOD FOR PRODUCING RETROREFLECTIVE MATERIAL HAVING PRINTED PATTERNS THEREON

RELATED APPLICATION

This application is a continuation-in-part of copending U.S. patent application Ser. No. 09/013,696, filed on Jan. 26, 1998, the teachings of which are incorporated herein by reference.

BACKGROUND OF THE INVENTION

A demand exists for retroreflective materials having printed patterns or graphics formed thereon. Retroreflective material is capable of reflecting the predominant portion of light rays impinging thereon in a substantially parallel path toward the source of the light. A particularly efficient type of retroreflective element employs molded members of cube-corner formations. Cube-corner reflectors molded from glass and more recently from acrylic resins or oligomers have commonly been employed as safety devices on bicycles, automobiles and other vehicles.

Rowland in U.S. Pat. No. 3,689,346, incorporated herein in its entirety by reference, describes a process in which retroreflective sheeting is produced on a continuous basis by applying transparent sheet material over a hardenable molding material previously deposited upon a moving mold surface, after which the molding material is solidified and bonded to the sheet material to produce a composite structure. The mold surface has an array of minute, contiguous cube-corner recesses therein, so that the sheeting correspondingly has a multiplicity of closely spaced cube-corner formations spaced about and projecting from a smooth surface of the sheet material, which provides the body portion thereof.

Bernard et al., U.S. Pat. No. 5,643,400, also incorporated herein in its entirety by reference, describes a continuous process for making lengthy sheets of "seamless" retroreflective sheeting using mold surfaces formed on a pair of rotatable drums.

Brown, U.S. Pat. No. 4,082,426 discloses a method of introducing markings into retroreflective sheeting which are visible when the sheeting is viewed at an angle under retroreflective viewing conditions to enable a viewer to determine the identity of the sheeting. The markings are provided on a transparent image layer disposed between a spacing layer and a specularly reflective layer. Palmquist in U.S. Pat. No. 2,354,049 discloses a stop sign having embossed (raised) lettering upon which a separate sheet of reflex light-reflector (retroreflector) material is applied to provide improved sight visibility. The beaded or retroreflective areas of the sheet are covered with black ink or paint in the raised letter areas to make the letters stand out more plainly.

Reininger in U.S. Pat. No. 2,231,139 discloses a sign structure in which the sign character is formed of protuberances formed integral with a translucent plate to produce reflection of incident light.

Phillipppi in U.S. Pat. No. 2,422,256 discloses a decalcomania transfer of retroreflective elements in which the sign design is pasted upon a decal base and coated with reflex-reflecting elements.

Coburn et al. in U.S. Pat. No. 4,656,072 produced colored indicia in retroreflective articles by patterns produced using colored adhesives which are visible behind retroreflective material.

Bradshaw et al. in U.S. Pat. No. 4,952,023 discloses an internally illuminated sign in which a graphic on a transparent face sign is made visible from the front of the sign by retroreflected light, internal illumination or both.

Despite the many efforts by those skilled in the art, and the above represents only a small sampling, there still remains an unfulfilled need for a high speed, high quality, low cost process of producing printed patterns for graphic, decorative and other utilitarian purposes on retroreflective sheeting.

SUMMARY OF THE INVENTION

In accordance with the invention, partially solidified printed patterns or graphics are formed on a transparent film utilizing a rotary screen printer. The film is then fed to prism forming station(s) where partially solidified transparent microprism structures are bonded over the printed patterns. The patterns and prisms are solidified and merged together thereby providing a long lasting image which is protected from the environment by being incorporated into the prism structure and covered by the film.

The prism structures may be designed to be retroreflective and have an air interface or reflective coating backing to the prism facets. The printed patterns can be used to enhance certain properties of the product such as whiteness. This can be accomplished by printing the pattern on a continuous roll or web of film around a drum and curing the prisms and patterns in line with other processes on the same or additional drums.

It is also possible to screen print onto a nickel tool one variety of prism forming liquid resin, and also screen print onto a web or film a different resin, and to then laminate the web to the tool. The material is then UV cured and stripped from the tool. What has been formed is a product with different characteristics between the top and bottom of the microstructure. This can be used to assist in joining the formed product to other substrates, or it can provide optical qualities to the film caused by the variance in physical properties in the microstructure. Physical properties that can be varied include color and refractive index.

Another use of the rotary screen printing method is to print patterns which enhance certain properties of a product, such as CAP Y or whiteness. In this method, lines or dots in a pattern, either repeating or random, can be printed and cured onto a moving web in line with other processes, such as the casting of microstructures. The printed lines or dots are under the top surface of the film, and above the microstructures and hence protected on both the top and the bottom. Either transparent or opaque inks can be used. In the case of opaque inks, they will show their color during daytime, but at night their pattern will appear black under reflected light from a microprism product. A colored transparent ink will reflect its color both in daytime and under reflected light.

Other transparent or opaque features can be printed in-line before a casting process, such as customized logos, colored stripes, specification markings or any number of identifying features. These items could be printed on a variety of microstructures, including microprisms, holograms, lenticular arrays, etc. All screen printed features can be printed in register with either a microstructure pattern or to another print pattern. This can provide for the masking of undesirable features, such as seamlines, or it can be used to add decoration to a product. Note that several screen printing heads can be used in sequence to achieve features with multiple colors or layers.

BRIEF DESCRIPTION OF THE DRAWINGS

FIG. 2A is a view taken along lines I—I of FIG. 2B of a portion of a web of film during step 1 of the method of the invention.

FIG. 2B is a side view of a portion of a web of film during step 1 of the method of the invention.

FIG. 3A is a view taken along lines II—II of FIG. 3B of a portion of a web of film during step 2 of the method of the invention.

FIG. 3B is a side view of a portion of a web of film during step 2 of the method of the invention.

FIG. 4A is a view taken along lines III—III of FIG. 4B of a portion of a web of film during step 3 of the method of the invention.

FIG. 4B is a side view of a portion of a web of film during step 3 of the method of the invention.

FIG. 5 is a fragmentary sectional view at a location about the drum axis illustrating the deposit of liquid from a coating head onto the printed matter on the web of film.

FIG. 6 is a fragmentary sectional view of the partially finished sheeting to an enlarged scale.

Figure 1:
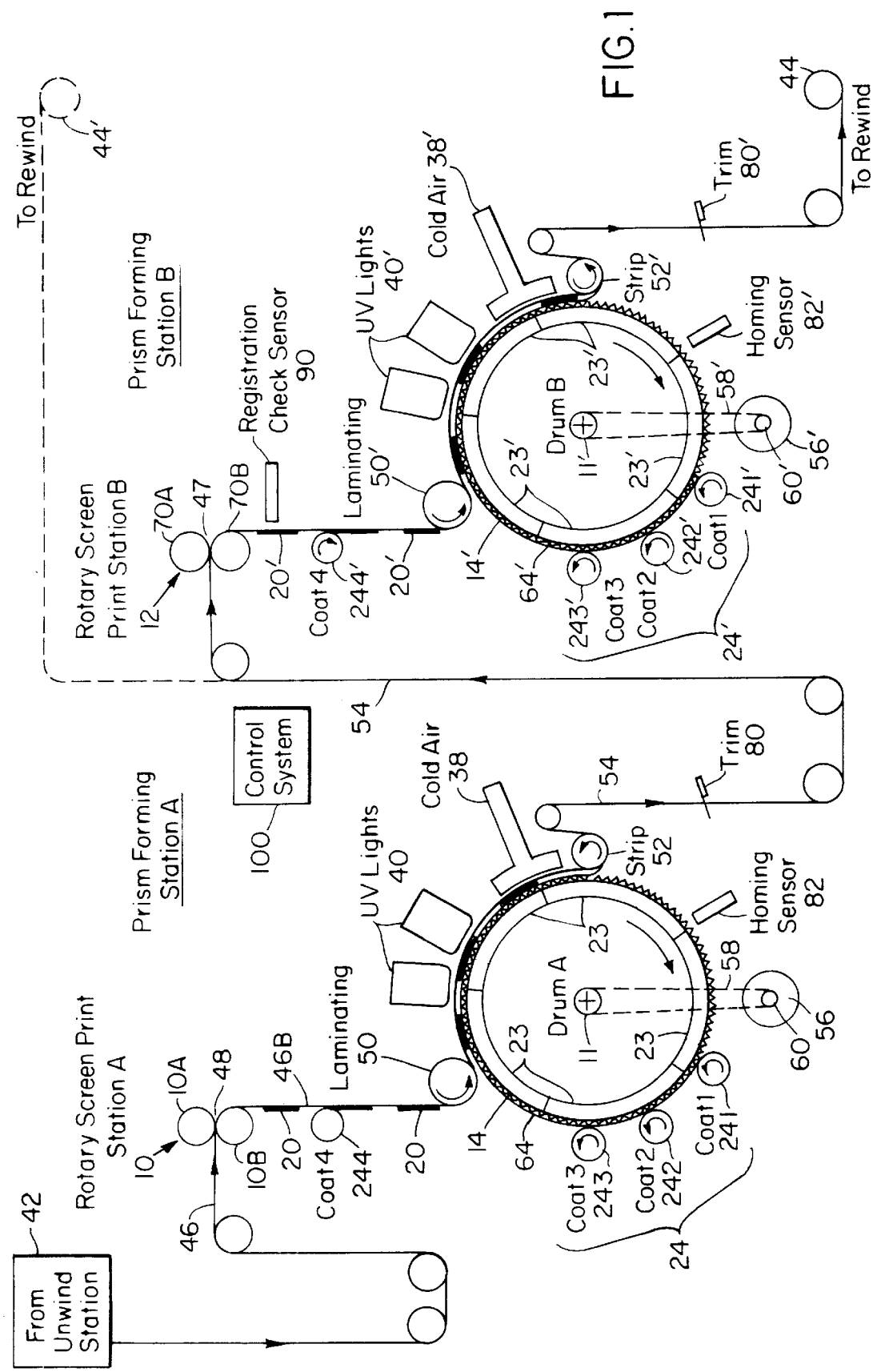
FIG. 1 is a schematic illustration of apparatus embodying the method of the invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The apparatus of the invention includes a well-known rotary screen printer 10 of the type made by Stork X-Cel B. V., The Netherlands. The printer is positioned at a print station A and is comprised of an upper plate cylinder 10A and a lower impression cylinder 10B. A web of film 46, to be printed upon, is unwound from the unwind station 42 and fed between an opening or nip 48 between the cylinders 10A and 10B, such that a pattern 20 of any design can be imprinted on the film 46. A squeegee (not shown) in cylinder 10A expresses or squeezes a paste of ink, paint, resin, colored oligomers or other print liquids through engraved or etched openings in a wire or nickel screen (not shown) provided on plate cylinder 10A. The uncured patterned film 46B is then fed to a laminating roller 50 where it is bonded to an array of partially solidified, transparent cube-corner prisms 64 formed in rotary molds 23 disposed around the circumference 14 of drum A.

A coating assembly, generally designated by the numeral 24 is mounted adjacent a segment of a drum A. This assembly consists of three coating stations: 241, 242 and 243, each one of which applies a metered amount of prism forming clear liquid, i.e., resin into the prism recesses (not shown) in molds 23. Each station includes the appropriate controls and rollers to precisely deposit the liquid without overfilling the recesses. Note, however in some applications it may be desirable to leave air bubbles in the prisms as described in U.S. Pat. No. 5,592,330 incorporated herein in its entirety by reference. The three stations are used to enhance the removal of air from the bottoms of the prismatic recesses.

A bank of ultraviolet lights 40 is mounted adjacent the drum A for curing or solidifying of the materials deposited thereon at a point about the axis between the laminating roller 50 and a cold air plenum 38.

A stripping roll 52 is disposed on the opposite side of the drum A, and the printed formed sheeting generally designated by the numeral 54 passes about it in its travel to either rewind roll 44' (shown in dotted lines) or to an optional second screen print station B and second prisms forming station B. Note that the second print station B and forming station B is not required if the entire circumference of the molds in drive A is initially filled with optical structures to make a continuous web of sheeting.

Before proceeding further, a brief review in connection with the generalized schematic flow diagram of the preceding main process steps up to the point of stripping off the laminated product may be in order. This review will be described in connection with FIGS. 2A–2C.

In step 1, FIGS. 2A and 2B, a transparent or clear web of film 46 is fed into the rotary screen printer 10 of FIG. 1 where a partially cured oligomer pattern 20, such as the letters BI, is printed on the clear film, as shown in FIGS. 3A and 3B.

Alternatively, the pattern may be a series of diagonal lines across the entire film formed, for example by a colored oligomer, such as an oligomer with a titanium oxide ($TiO_2$) pigment to create a white pattern which serves to improve the CAP Y or whiteness of the finished sheeting. Also the pattern can be disposed at areas where the mold plates 23 meet, so as to cover the seams formed in the casting operation.

Next, as shown in FIGS. 4A–4B, transparent, clear or colored, oligomer prisms 64 are cast upon the partially cured colored printed pattern 20. During the time that the film 46B passes through the laminating roll 50, the roll pressure causes the partially cured printed pattern 20 to be pushed into the prism mold cavities 21 (FIG. 5) causing the completely cured product 54 (FIG. 6) to be formed of completely clear prisms 64A and some prisms 64B with a colored pattern 20 between and within the prisms and the film 46B such that the pattern 20 can be viewed from the exposed side indicated by the light rays R in FIG. 6.

The apparatus of the invention can also be used to mix and match various prism sizes and materials on an integral retroreflective sheet by feeding a modified version of the sheeting produced at prism forming station A to a further prism forming station B. In this embodiment, the drums A and B are each provided with a number of prism molds 23 or tools with prism-shaped recesses 21 therein which can be filled with suitable oligomers, or resins.

The molds 23' in drum B can produce microprisms of a different pitch or size, and/or different orientation or tilt from the molds 23 in casting drum A. Also, as previously described, the rotary screen printer 10 can be used to register and print on the clear film 46 well defined areas or patterns of oligomers 20 on the film 46B which are then transferred to the prisms formed in the first molds 23 during the curing process performed by UV lights 40.

The same printing concepts can be used to register and print suitable prism forming oligomer in the recesses of a second set of tools 23' on drum B using the second rotary screen printer 12 at station B.

Figure 7:
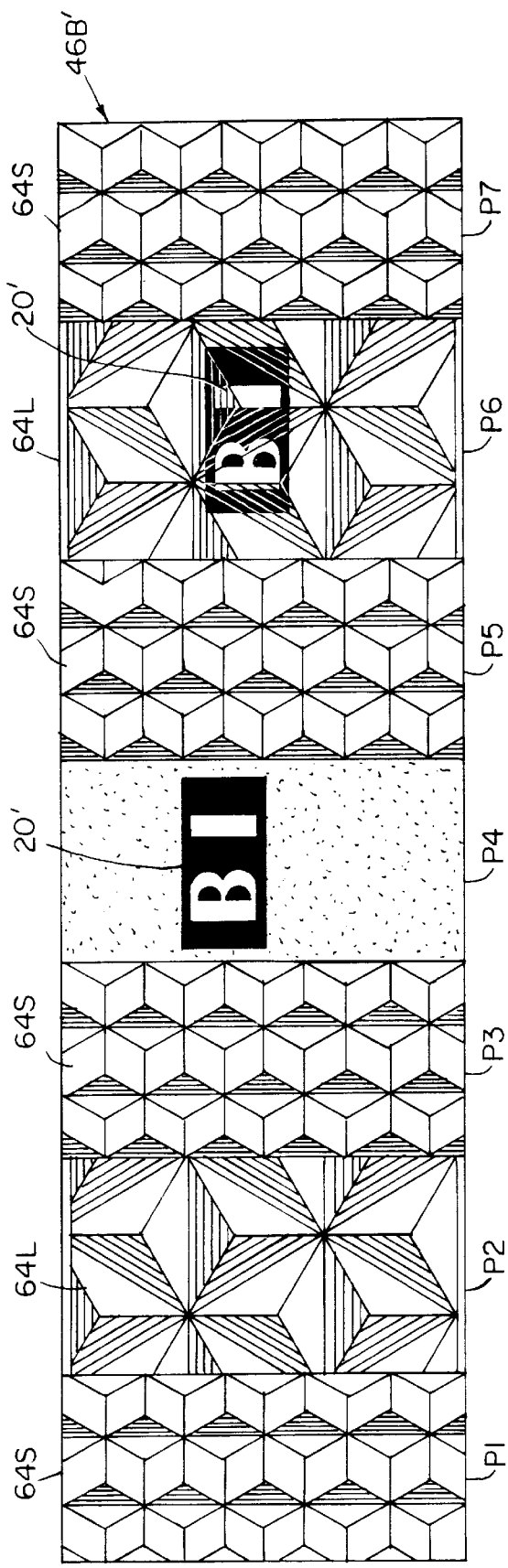
FIG. 7 is a view of a portion of a continuous sheet of material made in accordance with the invention.

FIG. 7 illustrates some of the many variations in prism size, texturing and graphics that can be introduced into retroreflective sheeting 54 using the apparatus of FIG. 1.

FIG. 7 depicts a top-view of a portion of a sheet of retroreflective material in which alternate portions P1–P7 are fabricated on alternate drums A and B. For example, portions P1, P3, P5 and P7 are formed on Drum A using small prism pitch tooling 23 to form small size prisms 64S without graphics supplied from print station A, and portions of the tooling at P2, P4, P6 left blank until the film 46B' is fed into drum B at prism forming station B.

The tooling 23' on drum B forms larger size prisms in the portions P2 and P6, whereas the tooling on drum B creates textured surfaces on the film or sheeting 46B' at portions P4.

The print station B can be operated to provide graphics for the film 46B' at any portion such as P4 or P6 prior to formation of texture as in P4 or bonding of prisms, as in P6.

It should be noted that the patterns, such as the graphic BI of 20' can be of any shape or size depending upon the desired pattern or optical properties required. Also, the portions between the first (A drum) tooling and second (B drum) tooling can be left void of oligomer to increase the Cap Y or whiteness of the product.

Figure 9:
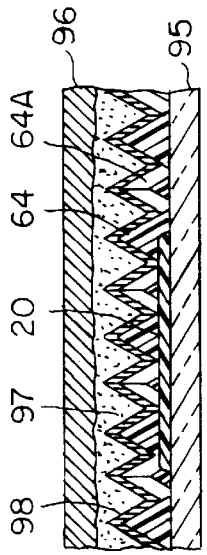
FIG. 9 is a section as in FIG. 8 showing a further step in the process.
Figure 8:
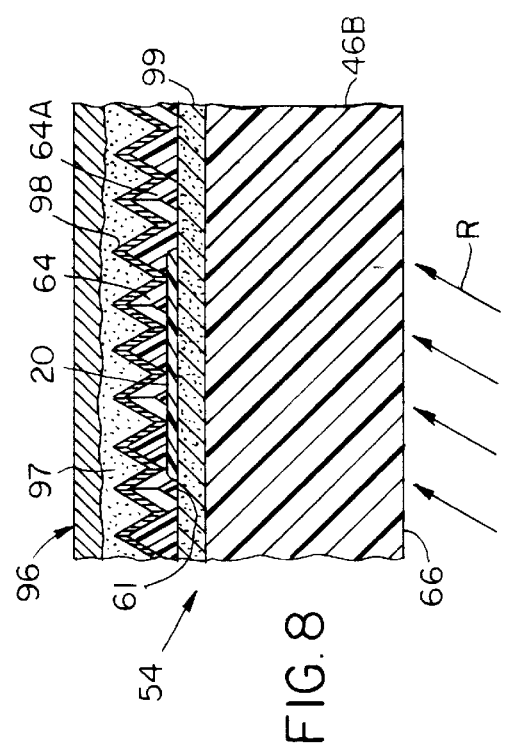
FIG. 8 is a fragmentary sectional as in FIG. 6 showing an alternate embodiment of the invention.

Turning now to FIG. 8, an alternate embodiment of the invention is illustrated therein in which a release coating or layer 99 is formed on the film 46B prior to printing the printed matter 20 on the film and prior to bonding the partially cured microprisms 64A over the printed matter 20. After the facet sides of the prisms 64A are made reflective, such as by metallizing with suitable material 98, the structure can then be applied to a suitable substrate 96 using an adhesive 97 to bond the metallized prism side to the substrate 96. Next, the film 46B and release layer 99 can be removed leaving the window or base side 61 of the prism array exposed along with the printed matter 20. At this point a suitable transparent protective layer 95 can be formed thereover as shown in FIG. 9.

This embodiment is particularly useful for providing fluorescent signage where the paint material 20 can be made of fluorescent material in the order of 0.0005" to 0.0030" thick and the protective layer 95 on substrate 96 can be also made of a thick fluorescent material, in the order of 0.006" to 0.010". Material such as acrylic, vinyl, or polycarbonate, selected according to its durability rather than its adaptability to an on-line rotary film process of manufacture can also be used for the protective layer.

The concept of leaving some areas of web or film 46 without oligomer can also be used to create an easy seal material. Retroreflective, ultrasonic or heat sealing becomes much easier if the very hard thermoset oligomer prisms do not need to be forced out of the way to allow a thermoplastic top film to flow and bond to a thermoplastic backing film. The pressure of contact plus the heat directed by the various sealing techniques will create a strong, homogeneous bond between the top film and backing film giving a very durable final product.

In addition, a web or film which is previously printed with a pattern such as a white dot or crosshatch pattern can be processed through the two casting drums A and B, and the discrete areas of oligomer can be registered to fill in the non-white areas with retroreflecting corner cube prisms of the size and orientation and tilt desired.

Finally, it is proposed that a web or film 46 which is previously embossed or cast with a pattern of microstructures, such as lenslets or grooves or linear prism structures, can be additionally processed using the two casting drums A and B as described above. The discrete areas of oligomer cured corner cubes on the drums A and B can be separated to bond onto the previously cast or embossed microstructures. The cast or embossed microstructures can be located in discrete locations or in patterns of varying microstructures to enhance the overall performance of the retroreflective film produced.

It should now be obvious that this invention can be extended to more than two casting drums and also to the manufacture of unique free prism systems.

Further details of the station B process will now be described with the aid of FIG. 1. Sheeting 54 travels from optional print station B, and printer 12 and cylinders 70A and 70B to the second drum B where it proceeds through a set of devices similar to that described in connection with drum A. The similar devices are designated by a prime suffix. Edge trimming stations 80' and 80 are employed after each station to remove any poorly replicated edges from the web 54. The motors 56 and 56' drive the drums A and B respectively in a conventional manner, under computer control from control system 100 using coupling chains 58 and 58' provided about the shafts 11 and 11' and shafts 60 and 60'.

Synchronized operation of the apparatus will be apparent from the foregoing and the following description. As the drums A and B and cylinders 10A, 10B, 70A and 70B continuously rotate, hardenable printing/molding material in fluid form is deposited thereupon on the prismatic recesses of molds 23 and 23' and on the film 46/54. The 25 coating stations 24/24' and print stations A and B are held in register through the homing sensors 82/82' mounted adjacent the circumference of the cylinders 10A/B 70A/B and drums A, B in a fixed position. The homing sensors provide an electrical feedback signal to the control system 100 to adjust the position of the coating stations 24/24' and paint stations.

Film 46 is continuously withdrawn from the feed reel 42 and applied first against the print station A and then drum A by the laminating roll 50, which cooperates with the drum A to provide a nip at which the hardenable material 64 is uniformly distributed over the surface of the prism array recess areas 21 of the selected molds 23 on drum A, and at which intimate contact is effected between the prism material 64 and the unsolidified pattern 20 on printed film 46B.

The freshly applied material 64 and the film 46 with the freshly applied printed matter 20, travel together past the bank of ultraviolet lamps 40, where hardening of the materials 64 and 20 and bonding thereof to the film 46B are concurrently effected. Thereafter, the cold air plenum 30 helps the material cool so that the partially completed reflective sheeting 54 can be readily stripped from the drum A.

The partially completed film 54 is optionally fed through print station B where additional printed matter 20' can be printed on the film. First, the film traverses past a registration check optical sensor 90. This sensor feeds an electrical signal related to the position of printed matter and prisms on the incoming web 54 to the computer control system 100 and positional corrections are processed to ensure that the partially completed reflective film 54 is in proper alignment to contact print station B and the drum B. After printing more matter 20' on web 54, the web is fed through the laminating roll 50', where it encounters the next freshly applied hardenable prism material 64' on the prism array recess areas of the molds 23' on drum B, but only at the spaces left empty on the film in the previous operation.

The timing of this operation should be done with precision, such that the two drives A and B operate in synchronization to preferably either eliminate any seam forming when the second operation is performed or to overlap the seams. Preferably, the two stations A and B are synchronized by a Berkeley Process Control System, Series 64, manufactured and sold by Berkeley Process Control, Inc. (labeled control system 100 in FIG. 1).

The first curing and print stations A are used as the master axis, and the second stations B are controlled to register the second station in line and to wind up the material. Precise machine control over all the drive mechanisms coupled with optical encoder feedback and a dedicated input utilizing flying position measurement is suggested.

For further information concerning control system 100, please refer to the previously noted U.S. Pat. No. 5,643,400.

Although the mold plates 23 may be formed from a synthetic resin, the preferred mold plate has a metallic surface to ensure a very smooth, precise surface on the cube-corner faces and to minimize the likelihood of deterioration during extensive use, as well as of possible adhesion between the molding materials and the surface of the mold. Accordingly, the mold may be fabricated directly from a suitable metal by engraving, hobbing or otherwise forming the cube-corner recesses therein. Alternatively, a suitably engraved or otherwise formed metallic member may be used as a master mold for forming the desired mold element by the deposition of metal thereon to form a layer of sufficient thickness which is then stripped therefrom. These stripped impressions which may be made by conventional electro-forming procedures are then used as the mold elements after mounting upon a suitable support surface to avoid injury thereto, and the mold surface may then be developed on a suitable support member from a multiplicity of such elements. In order to minimize corrosion of the metallic surfaces of the mold plates, it has been found desirable to provide a highly inert metallic coating thereon such as may be obtained by depositing gold or a gold alloy.

As illustrated, the support for the printing and mold surfaces is most desirably provided by rotatably mounted drums or cylinders which facilitate continuous application of materials and stripping of the composite product, and also provide firm support for the mold and paint elements thereon. Other types of support members are also feasible, such as a continuous flexible belt, or a revolving disk. However, certain disadvantages, such as the non-linear configuration of the product, may render the latter alternative less attractive. The means of securing the mold plates 23 to the drums may vary considerably depending upon the degrees of permanency and rigidity and the heat transfer characteristics desired; for example, they may be bonded with appropriate adhesives, or they may be affixed with suitable screws, rivets, pins or the like.

The design of material dispensers upon the moving surface and for stripping the composite printed film/prism array therefrom may also vary to a considerable degree from those of the illustrated embodiment, depending primarily upon the type of cylinders and drums employed, and different devices appropriate for substitution will be apparent to those skilled in the art.

Optionally, flow of the molding and print materials onto the prism recesses may be facilitated by the prior application of a solvent, plasticizer, wetting agent or other flow promoting agent (herein collectively referred to "wetting agent") using a fourth coating station 244, similar to the first three. This may enhance the fluidity of the molding material about the surfaces of the recesses and promote optimum fillage thereof. Care should be taken to use suitable material which does not dissolve or blot out the printed matter in this process.

The technique utilized for achieving solidification of the molding and printing material will vary with the particular material selected. When a molten synthetic resin is employed as the fluid molding and/or the printing material, solidification may be accomplished merely by cooling thereof; this may be accomplished through chilling of the mold, by directing cool air against the surface of the body member, as shown, or by allowing the heat energy to radiate therefrom. When the molding material is a B-stage or partially polymerized resin, solidification may be accomplished by the application of heat for a period of time sufficient to achieve the desired degree of polymerization. When the molding material is a cross linkable formulation, solidification may be accomplished by promoting cross linking of the component materials through any convenient means depending upon the nature of cross linkable material. As is well known in the art, cross linking may be effected by use of free radical initiators, heat, high energy radiation and the link, and the radiating elements depicted in the drawings may therefore comprise any suitable source of energy. Thus, they may be a simple infra-red or other heat source, a source of alpha or beta particles, gamma or X-ray radiation, photons, etc. Moreover, it will be appreciated that the molding material may be essentially monomeric in character and that the solidification thereof may be accomplished by polymerization in situ within the cube-corner recesses of the mold surface; such polymerization may be promoted by heat, free radical initiators, or high energy radiation, and the actinic source may be internal for the support member if so desired. In still another technique, a plastisol formulation may be employed in which the resin is fluxed by the plasticizer upon the application of heat. Obviously, combinations of these techniques also may be used to obtain the desired solidification.

Various synthetic resins may be employed for the cube-corner formulations, the printing material, and the sheet or film material, including polymers of (alk) acrylic acid esters such as polymethyl methacrylate and polybutyl acrylate; cellulose esters such as cellulose acetate polymer, cellulose acetate/butyrate copolymer, and cellulose propionate polymer; vinyl halides such as polyvinyl fluoride; vinylidene halides such as polyvinylidene chloride; monovinylidene aromatic hydrocarbon polymers such as polystyrene and styrene/acrylonitrile copolymers; ethylenically unsaturated nitrites such as polyacrylonitrile; polycarbonates; polyesters such as polyethylene terephthalate; polyphenylene oxide; polysulfones; and polyolefins such as polyethylene and polypropylene. Interpolymers of various of the several above-mentioned types of monomers, e.g., vinyl chloride/vinyl acetate copolymers, may also be employed, as may be mixtures of polymers. The particular resin formulations selected for the composite structure will vary depending upon the application, the thickness desired, the desire for flexibility, and the need for achieving interadhesion there between. For outdoor applications, materials which are moisture resistant, ultraviolet resistant and abrasion resistant are particularly advantageously employed at least for the exposed portion since that portion requires good weathering characteristics. Moreover, it will be appreciated that the sheet material may itself be a laminate of films or sheets of two different synthetic resins, and it may be provided with coatings of appropriate materials.

The resins preferably employed include polyvinyl halide, polyethylene terephthalate, polyvinylidene chloride, polycarbonates, polysulfones and cellulose ester polymers. The resins preferably employed for the cube-corner formations comprise (alk) acrylic acid ester resins, acrylic-modified vinyl chloride resins, vinyl chloride/vinyl acetate copolymers, ethylenically unsaturated nitrile resins, monovinylidene aromatic hydrocarbon resins, olefin resins, cellulose ester resins, polysulfone resins, polyphenylene oxide resins and polycarbonates. Exemplary combinations for the body portion/cube-corner formations include polyvinyl chloride/acrylic modified polyvinyl chloride; polyvinyl fluoride/polyvinyl chloride; polycarbonate/polycarbonate; polyvinyl chloride/polymethyl melthacrylate; polysulfone/polymethyl melthacrylate; polysulfone/polyvinyl chloride; and polyethylene terephthalate/polymethyl methacrylate.

In selecting the prism sheet materials employed for the present invention, it should be remembered that long lasting properties will require resins which do not have readily volatilizable plasticizers or other components, and which have an acceptable level of light stability. thus, stabilized formulations are desirably employed when the resin itself is susceptible to light or oxygen degradation. By proper selection of the resin systems, the sheet material may also provide a valuable degree of protection for the resin of the cube-corner formations, which may exhibit relatively poor stability when the cube-corner formations are selectively coated and further coated with a lacquer and/or adhesive. These coatings also may act as protective layers since the body portions will, in many applications, serve as a barrier layer for ultraviolet radiation, vapor, gasses, etc. Moreover, the sheet material is desirably fabricated of a resin which affords a high degree of abrasion resistance since aberrations in the front surface of the composite structure will greatly reduce its retroreflectivity.

It will be readily appreciated that the cube-corner formations must have smooth faces and that the intersecting faces thereof should provide essentially perfect cube-corners. Any deviation from a perfect cube-corner or surface irregularity will materially reduce the retroreflectivity of the formation, and is desirable only under certain controlled circumstances.

Normally, the air interface at the cube-corner formations will be relied upon for retroreflection of the light rays. Obviously, the angle at which the light rays strike the faces of the cube-corners will determine whether each ray is retroreflected or passes outwardly through the rear surface. If the angle of incidence is less than the critical angle for the prism material employed, the light ray will not be retroreflected. However, the predominant portion of light rays entering the front surface of the sheet material will be retroreflected by the cube-corner formations.

The reflectivity of the cube-corner formations can be enhanced by depositing a reflective coating thereon. Such a coating may be conveniently provided by a metallizing technique such as that wherein a very thin film of aluminum or other metal is deposited on the surface by vaporization thereof at a very low subatmospheric pressure; chemical deposition techniques may also be used. Reflective coatings may also be provided by use of a lacquer containing metallic particles of pigments affording high degrees of reflectivity; for example, pearl lacquers may be employed. In still another technique, the reflective coating may be provided by a metallized synthetic plastic film applied in intimate contact over the surface of the cube-corner formations.

Although the cube-corner formations in the illustrated embodiment have a uniform orientation within the array, it is possible to employ a pattern in which certain of the cube-corner formations are disposed in such a manner that their faces are not parallel to any of the faces of the adjacent cube-corner formations. Moreover, certain of the cube-corner formations may be disposed with their apices aligned other than vertically over the center of their respective bases. By thus tipping some of the cube-corner formations, retroreflectivity over a broader angle is provided for certain applications, while maximum reflectivity is diminished. This is desirable for certain applications; for example, highway signs desirably may exhibit retroreflection over a broader angle relative to the surface of the sign and some light scattering desirably may be provided although the light rays falling thereon may be essentially perpendicular to its face.

By use of a sheet material of a relatively flexible resin, the composite structure may be readily shaped to various support surfaces, such as the corners of buildings, the contour of hand rails, etc. Moreover, since the composite structure may be very thin, seamless appearing, and highly flexible, it may be readily applied to fabrics used as garments, or it may itself be used in such a manner, thus affording a great deal of night-time visibility to the wearer. Exemplary uses for safety applications are tabs and stripes on jackets and rainwear, tags that may be worn at various points upon the body, reflective patches for hats, reflective welting for the production of various garments, etc.

Figure 10:
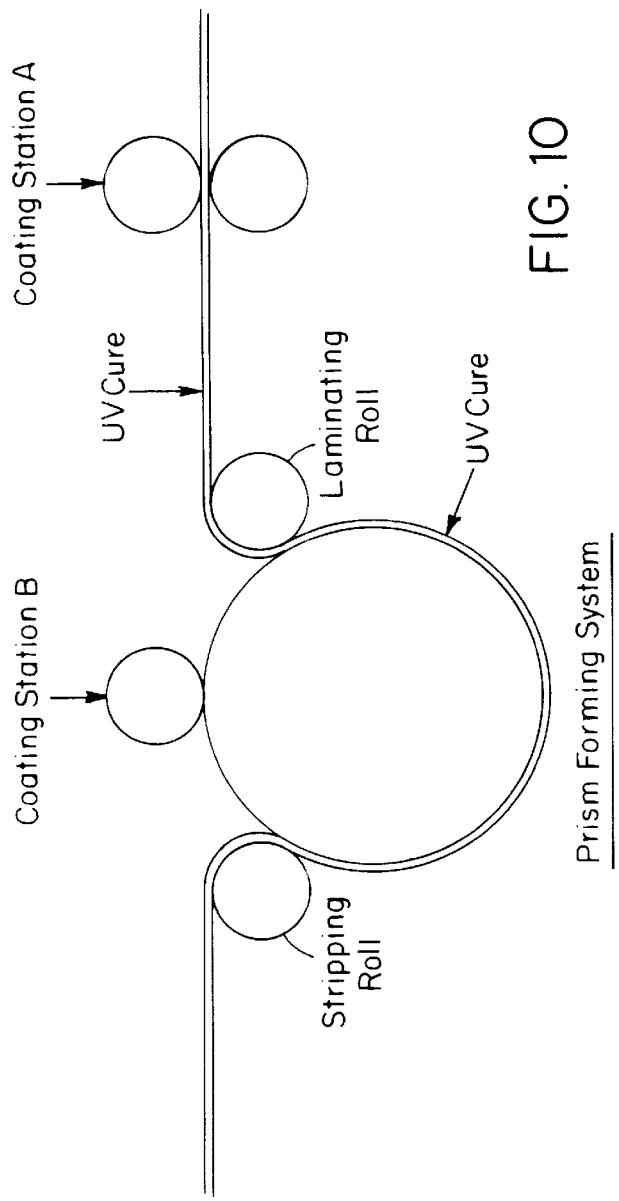
FIG. 10 is a schematic illustration of an apparatus of the method of the present invention.

A double coating or printing system is shown in FIG. 10 and is described below. The terms "printing system" and "coating system" can be used interchangably. Coating station A applies to a top film various thickness color coatings on prism formulations and patterns which are either fully cured or partially cured prior to reaching the laminating roll depending on the product configuration desired. Coating station B is used to apply various thickness and colored prism formulations to the tooling on the casting drum prior to reaching the laminating roll. When the material applied to the top film is combined with the material applied to the tooling by using the prism forming system, various product constructions can be made.

Figure 11:
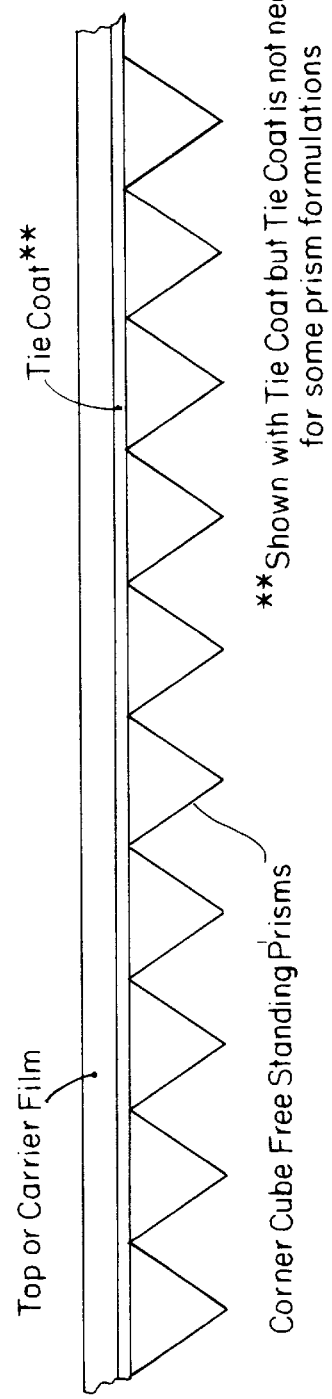
FIG. 11 is a side view of a portion of an embodiment of a retroreflective structure formed by a method of the invention.

FIG. 11 discloses a typical product construction. A tie coat, when needed, is normally applied to the top film in a separate off-line coating process. A dual coating system, shown in FIG. 10, can apply a tie coat at coating station A. It can be ultraviolet cured and then the prisms are cast and cured by known methods such as described in U.S. Pat. Nos. 3,684,348 and 3,689,346, the teachings of which are incorporated herein by reference. The UV cured tie coat is designed to bond to the substrate film and the UV cured prisms are designed to bond to the tie coat. In addition, the ultraviolet cured tie coat can be colored with transparent light stable dyes to produce sheeting where the color is protected between the top coat and the prisms. The tie coat is not always needed, as in the case when the prism is designed to bond directly to the substrate.

Figure 12:
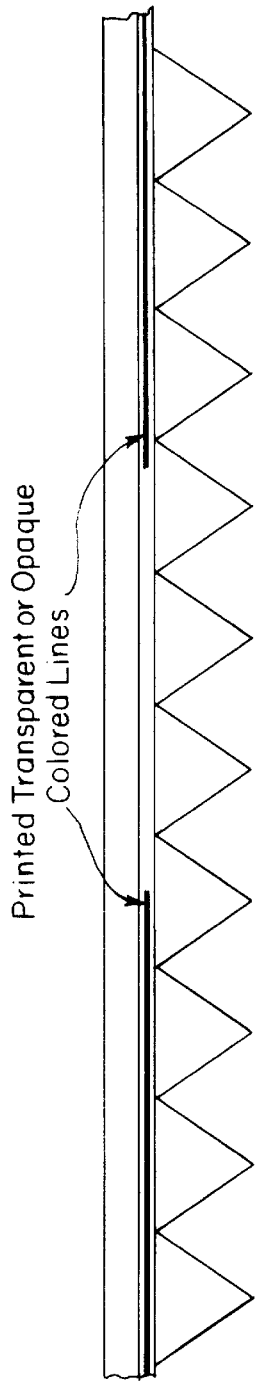
FIG. 12 is a side view of a portion of a second embodiment of a retroreflective structure formed by a method of the invention.

FIG. 12 discloses the product obtained when the substrate top film is tie coated off line. Coating station A is used to coat and cure a thin pattern, any shape and transparent or opaque, on the tie coat coated top film. Coating station B is used to provide the transparent prism material formulation in sufficient quantity applied onto the tooling to form solid prisms. If a tie coat is not used on the top film, the prism formulation used is designed to bond to the pattern material and the top film surface.

Figure 13:
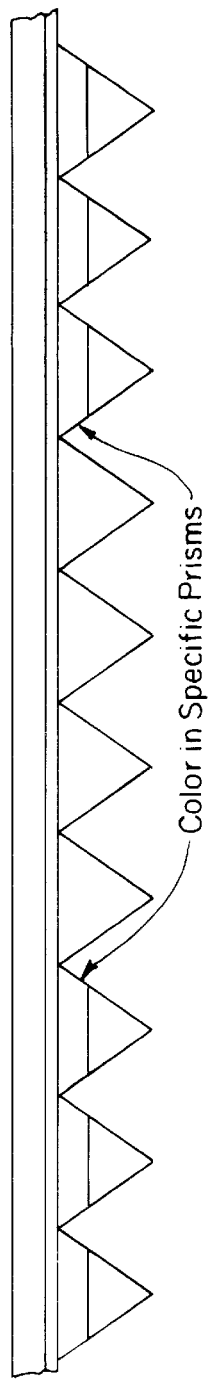
FIG. 13 is a side view of a portion of a third embodiment of a retroreflective structure formed by a method of the invention.

FIG. 13 shows the product construction obtained when the substrate top film is tie coated off line. Coating station A is used to coat and partially cure a relatively thick transparent colored prism formulation as a pattern on the tie coated top film. Coating station B is used to apply a relatively thick transparent prism formulation across the entire tooling width forming well defined areas/patterns of colored prisms in well defined areas/patterns of clear prisms when the prism forming process is complete. A one pattern product construction of all colored or all clear prisms can be made using this method by using the same prism formulation at each coating station. Also, the described production constructions can be made without a tie coat by adjusting the prism formulation. A tie coat is beneficial when a product is made with polyvinyl chloride and is to be metallized. The tie coat helps prevent plasticizer migration onto the prism faces and the resulting interaction that can take place with a coated metal.

Figure 14:
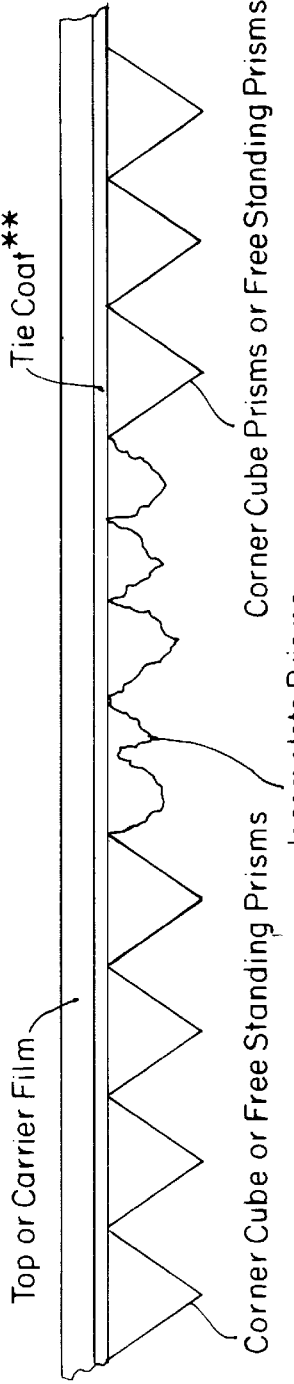
FIG. 14 is a side view of a portion of a fourth embodiment of a retroreflective structure formed by a method of the invention.
Figure 15:
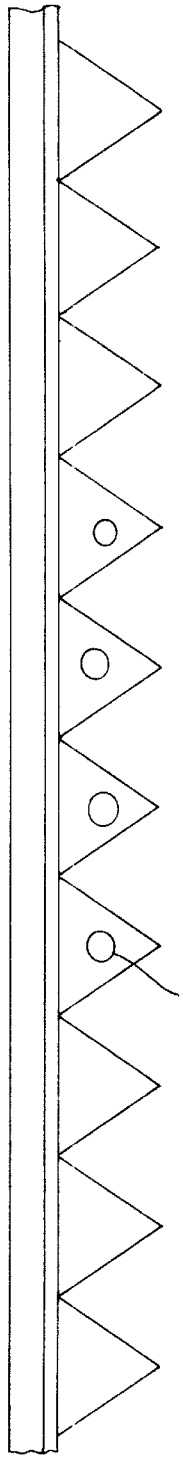
FIG. 15 is a side view of a portion of a fifth embodiment of a retroreflective structure formed by a method of the invention.

FIG. 14 shows the product construction obtained when the substrate top film is tie coated off line. The coating station A is used to coat and partially cure a relatively thick transparent colored prism formulation as a pattern on the tie coated top film. Coating station B is used to apply a relatively thin transparent prism formulation across the entire tool, forming well defined areas/prisms of incomplete prisms when the prism forming process is complete. Insufficient prism formulation is present to begin to form prisms leaving a surface which has a matte appearance. The product, shown in FIG. 15, is created by the same method as the product in FIG. 14 except that at coating station B, slightly more of the prism formulation is applied to the tooling allowing the prisms in the areas between coating station A pattern coated areas to form air sphere prisms providing the benefits described in U.S. Pat. No. 5,592,330, issued to Bernard, the teachings of which are hereby incorporated by reference.

Figure 16:
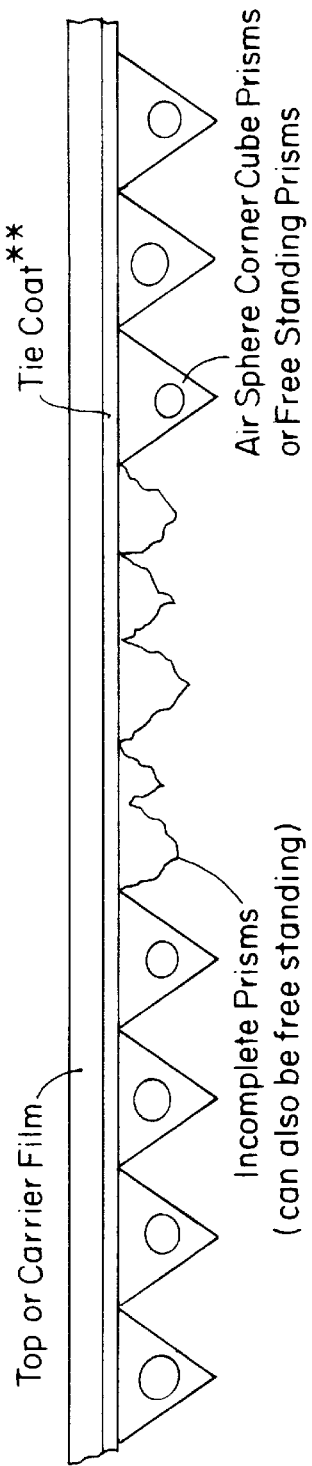
FIG. 16 is a side view of a portion of a sixth embodiment of a retroreflective structure formed by a method of the invention.

FIG. 16 is another variation of the product described in FIGS. 14 and 15. In this embodiment, the pattern applied at coating station A has a reduced amount of prism formulation in the prism formulation applied at station B is reduced to the level required to produce the matte finish in between the pattern area. The reduction of the prism formulation at coating station A causes air sphere prisms to be formed in the pattern coated areas.

Figure 17:
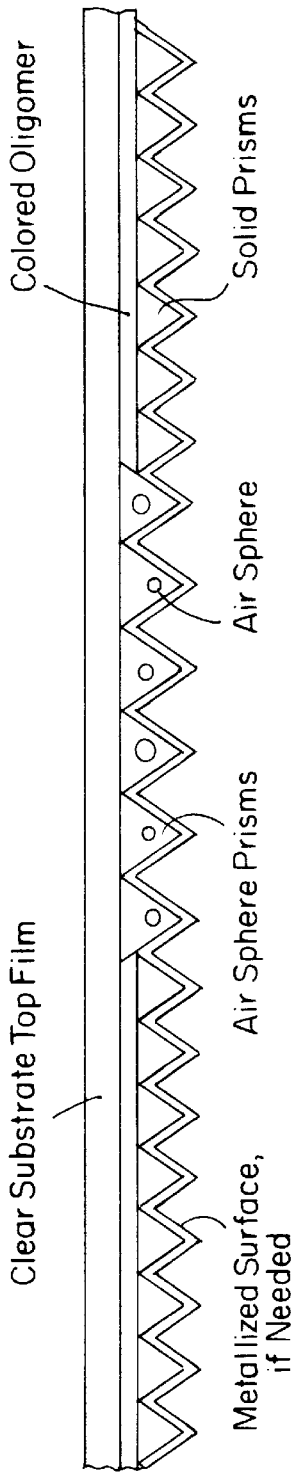
FIG. 17 is a side view of a portion of a seventh embodiment of a retroreflective structure formed by a method of the invention.

Seamless material manufacturing can be used to produce retroreflective material which is includes air sphere configuration and defined areas in full solid corner cubed construction and other defined areas. A casting drum is covered with sufficient oligomer to create air sphere corner cubes during the lamination process and the incoming substrate web is printed with a pattern of oligomer which when the pattern oligomer combines with the oligomer on the drum it creates solid corner cube prisms in the pattern configuration printed on the substrate. This concept can be used to create any pattern of solid prisms and air sphere prisms desired. The combined air sphere corner cube and solid corner cube prisms provide a defined retroreflective light distribution with a solid corner cubed prisms providing excellent long distance performance (narrow observation angle) and short distance performance (wide observation angle). An example of this product construction flexibility is shown in FIG. 17. The red oligomer is transparent and the difference in the retroreflectivity between an sphere and solid prism area creates enhanced contrast allowing an easy to read sign. The colored oligomer can be red in color for form a red area in a STOP sign.

Figure 18:
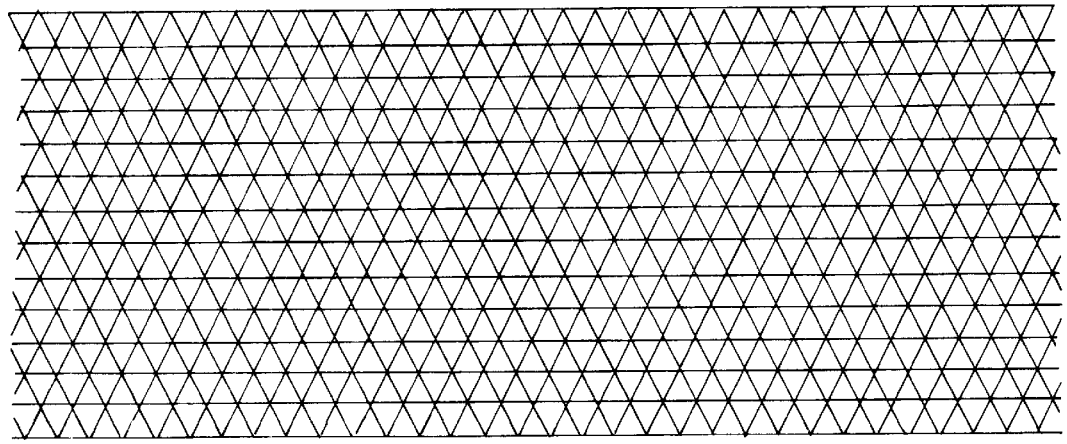
FIG. 18 is a top view of the structure in FIG. 17.
Figure 19:
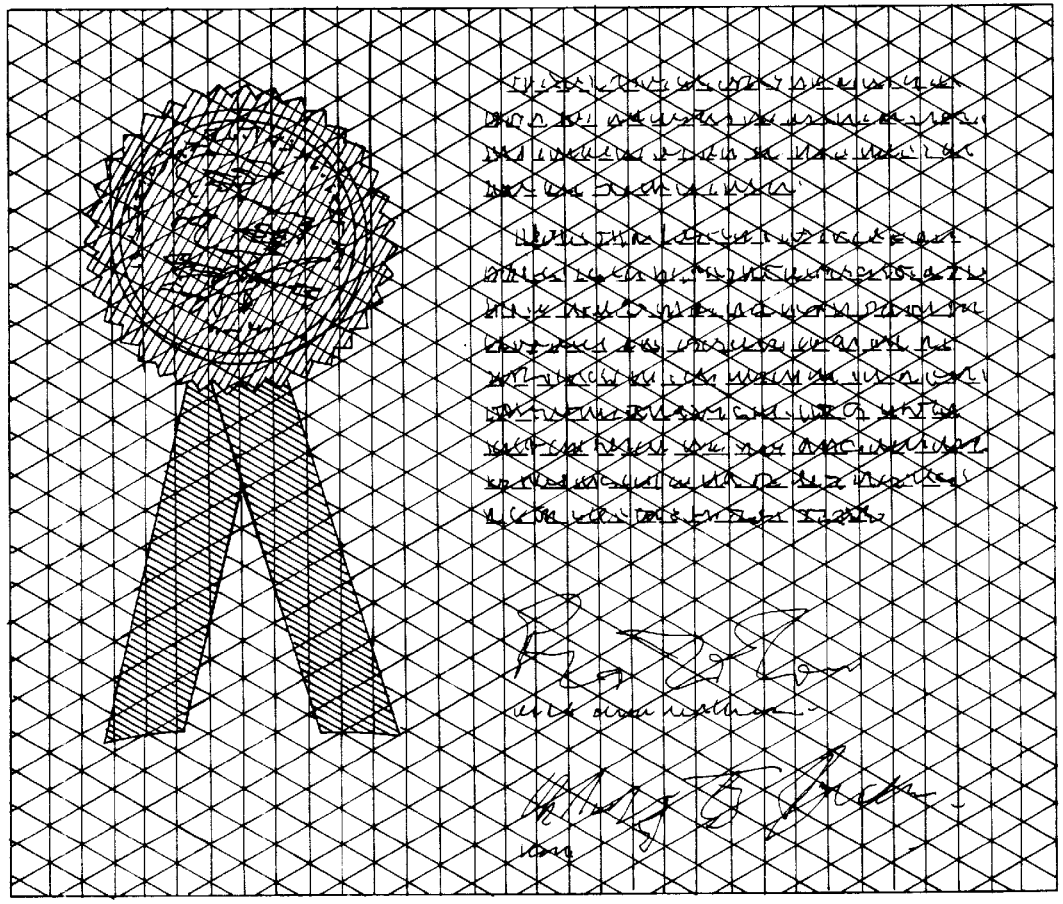
FIG. 19 is a top view of an embodiment similar to FIG. 18 but with a document printed upon it.

FIG. 18 shows a top view of 'the material with solid prism line pattern and air sphere prisms in triangular areas. FIG. 19 shows a photocopy of material with a message printed on top surface of clear substrate top film. The lines (formed by solid prisms) appear as dark lines and triangles formed by air sphere prisms appear as white areas. Such a retroreflective structure can be used to form security documents, such as stock certificates and the like. Further, portions of the document can have a series of long thin lines at portions which can in combination with the retroreflective structure form a moiré pattern when photocopied.

Figure 20:
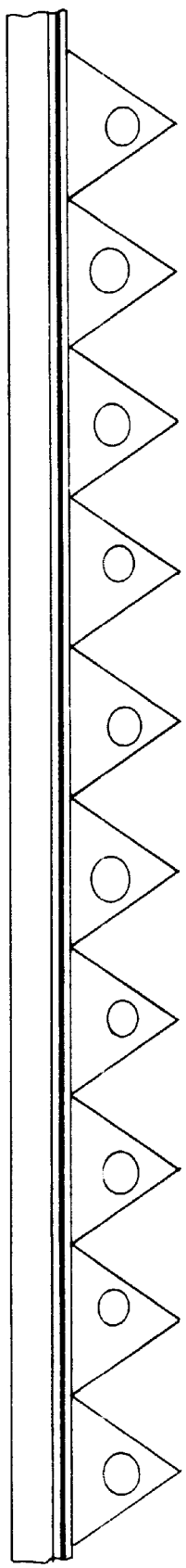
FIG. 20 is a side view of a portion of an eighth embodiment of a retroreflective structure formed by a method of the invention.

FIG. 20 is a product construction which results if coating station A is used to coat a transparent UV cured colored tie coat across an entire web. Coating station B is used to coat a sufficient amount of prism formulation to create air sphere prisms across the entire web. In this embodiment, the color is on the top layer of the prism and if a release coat were used between the top film and the tie coat, the color would end up on the top face of the free standing prisms created.

Figure 21:
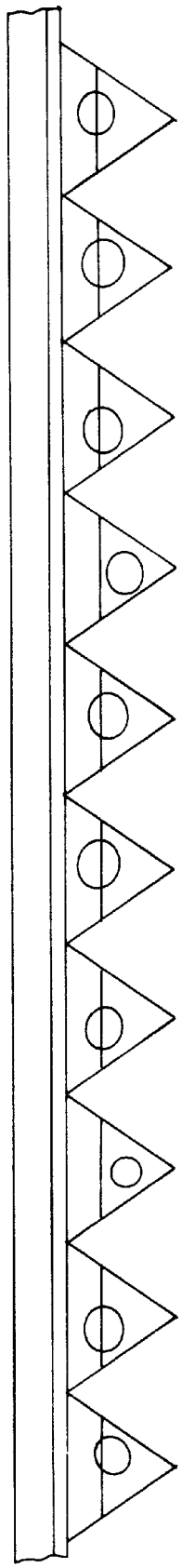
FIG. 21 is a side view of a portion of a ninth embodiment of a retroreflective structure formed by a method of the invention.

FIG. 21 is a product construction which results if coating station A is used to coat a transparent colored prism formulation across an entire web. Coating station B is used to coat sufficient prism formulation to create air sphere prisms across the web. In this embodiment, the transparent color is in the prism and if a release coat were used between the top film and the colored prism formulation, the color would end up within the structure of the free standing prisms created. Coating station A applies to the top film various thickness color coatings or prism formulations.

Additional coating stations can be added in line at coating station A and at coating station B to create multiples of the color and prism shape effects desired. Also, when multiple prism forming systems are used, stripes around the circumference of the large drum in FIG. 10 can be created by coating stripes at both coating stations A and B which are coincident with each other. When the material reaches a second drum, the areas between the stripes can be filled to create a filled surface on the top film. Prisms of different sizes or orientations can be applied at each prism forming station creating a parallel strip appearance on the top film. The spacing of the strips can be as small or large as desired.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method of producing a patterned sheet of retroreflective material comprising the steps of printing the patterns on a transparent film, applying microprisms onto said patterns, such that the patterns are protected from the environment by being incorporated onto a window side of the microprisms and covered by the film, the microprisms having a base and side facets, wherein the patterns and microprisms are partly solidified as formed and after the microprisms are applied to the patterns and wherein the patterns and microprisms are solidified so that printed patterns are embedded into the base of the microprisms.

2. The method of claim 1 wherein the microprisms are transparent and have a base and at least three side facets and wherein the facets are provided with a reflective backing.

3. The method of claim 2 wherein the film and microprisms are formed of the same material.

4. The method of claim 2 wherein the film and microprisms are formed of different material.

5. The method of claim 1 wherein the film is formed in a continuous roll.

6. A method for printing patterns of print material on microstructured optical sheeting by forming a film upon which an array of prisms is formed comprising the steps of:
   printing said patterns on selected areas of a first side of said film;
   applying a prism forming material to a first mold surface having prismatic recesses therein to at least partly fill the recesses with said material;
   transferring the material to the first side of the film to form first areas of arrays of prisms over the patterns leaving second areas of blank spaces on said first side of the film;
   applying said prism forming material to a second mold surface having prismatic recesses therein to at least partially fill the recesses in the second mold surface with said material; and
   transferring the material in the recesses of the second mold surface onto the areas of blank spaces in the first side of the film in such a manner as to form a continuous film of sheeting on the first side of the film, the prisms having a base and side facets, wherein the patterns and prisms are partly solidified as formed and after the prisms are applied to the patterns and wherein the patterns and prisms are solidified so that printed patterns are embedded into the base of the prisms.

7. The method of claim 6 wherein the prismatic recesses in the first mold surface differ in size from those in the second mold surface.

8. The method of claim 6 wherein the areas of the spaces and areas of arrays on said mold surfaces are substantially equal and are alternately spaced over each of the mold surfaces.

9. The method of claim 6 wherein the selected areas of the printed patterns are located opposite both the first and second areas of arrays of prisms.

10. The method of claim 6 wherein the prism forming material and the pattern material are the same.

11. A method of forming easy-sealable retroreflective sheeting comprising the steps of:
   a) providing a mold surface containing contiguous arrays of prismatic recesses;
   b) applying prism forming material to the selected areas of the arrays leaving other selected areas devoid of prism forming material;
   c) applying a front film to said mold surface and transferring the prism forming material from the mold to the front film leaving certain areas on the front film without prism forming material;
   d) solidifying the prism material to form a plurality of prims having a base and side facets;
   e) applying a back film over the areas of solidified prisms;
   f) sealing the front film to the back film at the said certain areas without prism forming material; and
   g) partially curing a printed pattern on the front film prior to transferring the prism forming material from the mold, wherein the patterns and prisms are partly solidified as formed and after the prisms are applied to the patterns and wherein the patterns and prisms are solidified so that printed patterns are embedded into the base of the prisms.

12. The method of claim 11 wherein the mold surface is formed on the periphery of a circular rotary drum.

13. A method for printing patterns of print material on retroreflective sheeting by providing a film upon which an array of prisms is formed comprising the steps of:
   printing said patterns on selected areas of a first side of said film;
   applying a prism forming material to a first mold surface having prismatic recesses therein to at least partly fill the recesses with said material;
   transferring the material to the first side of the film to form first areas of arrays of prisms over the patterns leaving second areas of blank spaces on said first side of said film;
   applying said prism forming material to a second mold surface having prismatic recesses therein to at least partially fill the recesses in the second mold surface with said material; and
   transferring the material in the recesses of the second mold surface onto some of the areas of blank spaces in the first side of the film in such a manner as to form a continuous film of sheeting on the first side of the film some areas of which have prism material directly attached to the film, and others have prism material covering the patterns and attached to the film and other areas have neither and can be used as sealing areas for attaching a sealing film over the sheeting, the prisms having a base and side facets, wherein the patterns and prisms are partly solidified as formed and after the prisms are applied to the patterns and wherein the patterns and prisms are solidified so that printed patterns are embedded into the base of the prisms.

14. A method for producing a patterned sheet of microstructure optical sheeting comprising the steps of printing the patterns on a first side of a transparent film and applying the microstructures to a second side of said transparent film, the microstructures having a base and side facets, wherein the patterns and microstructures are partly solidified as formed and after the microstructures are applied to the patterns and wherein the patterns and microstructures are solidified so that printed patterns are embedded into the base of the microstructures.

15. A method for producing a patterned sheet of microstructure optical sheeting comprising the steps of printing the patterns on a first side of a transparent film and applying the microstructures to the first side of said transparent film, the microstructures having a base and side facets, wherein the patterns and microstructures are partly solidified as formed and after the microstructures are applied to the patterns and wherein the patterns and microstructures are solidified so that printed patterns are embedded into the base of the microstructures.

16. The method of claim 1 wherein the patterns are transparent.

17. The method of claim 1 wherein the patterns have a different index of refraction than the microprisms.

* * * * *